(12) United States Patent
Maryfield et al.

(10) Patent No.: US 11,940,244 B2
(45) Date of Patent: Mar. 26, 2024

(54) AUTOMATIC SCOPE ZOOM SENSING FOR RIFLE MOUNTED CLIP-ON FIRE CONTROL DISPLAYS

(71) Applicant: Cubic Corporation, San Diego, CA (US)

(72) Inventors: Tony J. Maryfield, Poway, CA (US); Mahyar Dadkhah, San Diego, CA (US); Christian Marcello Cugnetti, San Diego, CA (US); Michael Andre Roes, San Diego, CA (US)

(73) Assignee: Cubic Corporation, San Diego, CA (US)

( * ) Notice: Subject to any disclaimer, the term of this patent is extended or adjusted under 35 U.S.C. 154(b) by 49 days.

(21) Appl. No.: 17/880,454

(22) Filed: Aug. 3, 2022

(65) Prior Publication Data

US 2023/0043709 A1    Feb. 9, 2023

Related U.S. Application Data

(60) Provisional application No. 63/228,996, filed on Aug. 3, 2021.

(51) Int. Cl.
*G06G 7/80* (2006.01)
*F41G 1/38* (2006.01)
*G02B 23/00* (2006.01)
*G02B 23/16* (2006.01)

(52) U.S. Cl.
CPC .............. *F41G 1/38* (2013.01); *G02B 23/145* (2013.01); *G02B 23/16* (2013.01)

(58) Field of Classification Search
CPC ....... F41G 1/38; F41G 11/00; G02B 27/0172; G02B 2027/0123; G02B 23/145; G02B 27/34; G01C 21/3664
USPC .................................................. 235/404, 405
See application file for complete search history.

(56) References Cited

U.S. PATENT DOCUMENTS

| | | | |
|---|---|---|---|
| 10,443,984 B2 | 10/2019 | Maryfield et al. | |
| 2014/0115942 A1* | 5/2014 | Plaster | F41G 1/38 42/126 |
| 2015/0135578 A1* | 5/2015 | Walker | F41G 1/16 74/553 |
| 2018/0231352 A1* | 8/2018 | Davidson | F41G 1/38 |
| 2019/0293919 A1* | 9/2019 | Hamilton | G02B 27/34 |
| 2019/0376755 A1 | 12/2019 | Teetzel et al. | |
| 2021/0068655 A1* | 3/2021 | Zhang | A61B 3/103 |

* cited by examiner

*Primary Examiner* — Daniel St Cyr
(74) *Attorney, Agent, or Firm* — MUGHAL GAUDRY & FRANKLIN PC

(57) ABSTRACT

An automatic zoom-sensing riflescope display adapter (RDA) system can illuminate an iris of a user with a beam from a light emitter. The RDA system can activate a display which includes at least one graphical element visible by the user through an eyepiece. Additionally, the RDA system can focus an image of the iris on a sensor. The RDA system can determine a diameter of the iris from the image of the iris using an iris analyzer. The RDA system can develop a calibration table that correlates the diameter of the iris to a zoom level of an optical scope. The RDA system can estimate the zoom level of the optical scope from the diameter of the iris via the calibration table. Additionally, the RDA system can adjust, to match the zoom level, a font size of the at least one graphical element of the display.

20 Claims, 4 Drawing Sheets

AUTOMATIC SCOPE ZOOM SENSING FOR RIFLE MOUNTED CLIP-ON FIRE CONTROL DISPLAYS

This application claims the benefit of U.S. Provisional Application Ser. No. 63/228,996 by Maryfield et al., filed on Aug. 3, 2021, entitled "AUTOMATIC SCOPE ZOOM SENSING FOR RIFLE MOUNTED CLIP-ON FIRE CONTROL DISPLAYS," the disclosure of which is incorporated by reference herein in its entirety.

BACKGROUND OF THE INVENTION

This disclosure relates in general to optical scopes and, but not by way of limitation, to improved displays.

A class of optics have been developed that can assist with the task of targeting a desired aimpoint across large distances. The class is referred to as "smart scopes". Smart scopes can include electro-optic attachments to rifles. The smart scopes can determine and present an aiming solution. Smart scopes can include an electronic display with at least one graphical element. When a user changes a zoom level associated with an optical scope for a rifle, there can be difficulties viewing the at least one graphical element due to incompatibility between the zoom level and a font size for the at least one graphical element.

BRIEF SUMMARY OF THE INVENTION

An example method of automatically detecting a zoom setting and adjusting, to match the zoom setting, a font size of at least one graphical element with an automatic zoom-sensing riflescope display adapter (RDA) system, according to the description, comprises illuminating an iris of a user with a beam from a light emitter. The method further includes activating a display which includes the at least one graphical element visible by the user through an eyepiece. The method also includes focusing an image of the iris on a sensor. The method includes determining a diameter of the iris from the image of the iris using an iris analyzer. The method further includes developing a calibration table that correlates the diameter of the iris to a zoom level of an optical scope. The method also includes estimating the zoom level of the optical scope from the diameter of the iris via the calibration table. The method further includes adjusting, to match the zoom level, the font size of the at least one graphical element of the display.

An example automatic zoom-sensing RDA system, according to the description, comprises a light emitter configured to illuminate an iris of a user with a beam. The RDA system further comprises a display comprising at least one graphical element visible by the user through an eyepiece. The RDA system further includes a sensor configured to focus an image of the iris. The RDA system further includes an RDA controller communicatively coupled to the light emitter, the display and the sensor and configured to perform operations including determining a diameter of the iris from the image of the iris using an iris analyzer. The RDA controller operations further include activating the display. The RDA controller operations further include developing a calibration table that correlates the diameter of the iris to a zoom level of an optical scope. The RDA controller operations further include estimating the zoom level of the optical scope from the diameter of the iris via the calibration table. The RDA controller operations further include adjusting, to match the zoom level, a font size of the at least one graphical element on the display.

BRIEF DESCRIPTION OF THE DRAWINGS

For a more complete understanding of this invention, reference is now made to the following detailed description of the embodiments as illustrated in the accompanying drawings, in which like reference designations represent like features throughout the several views and wherein.

DETAILED DESCRIPTION OF THE INVENTION

Figure 1:
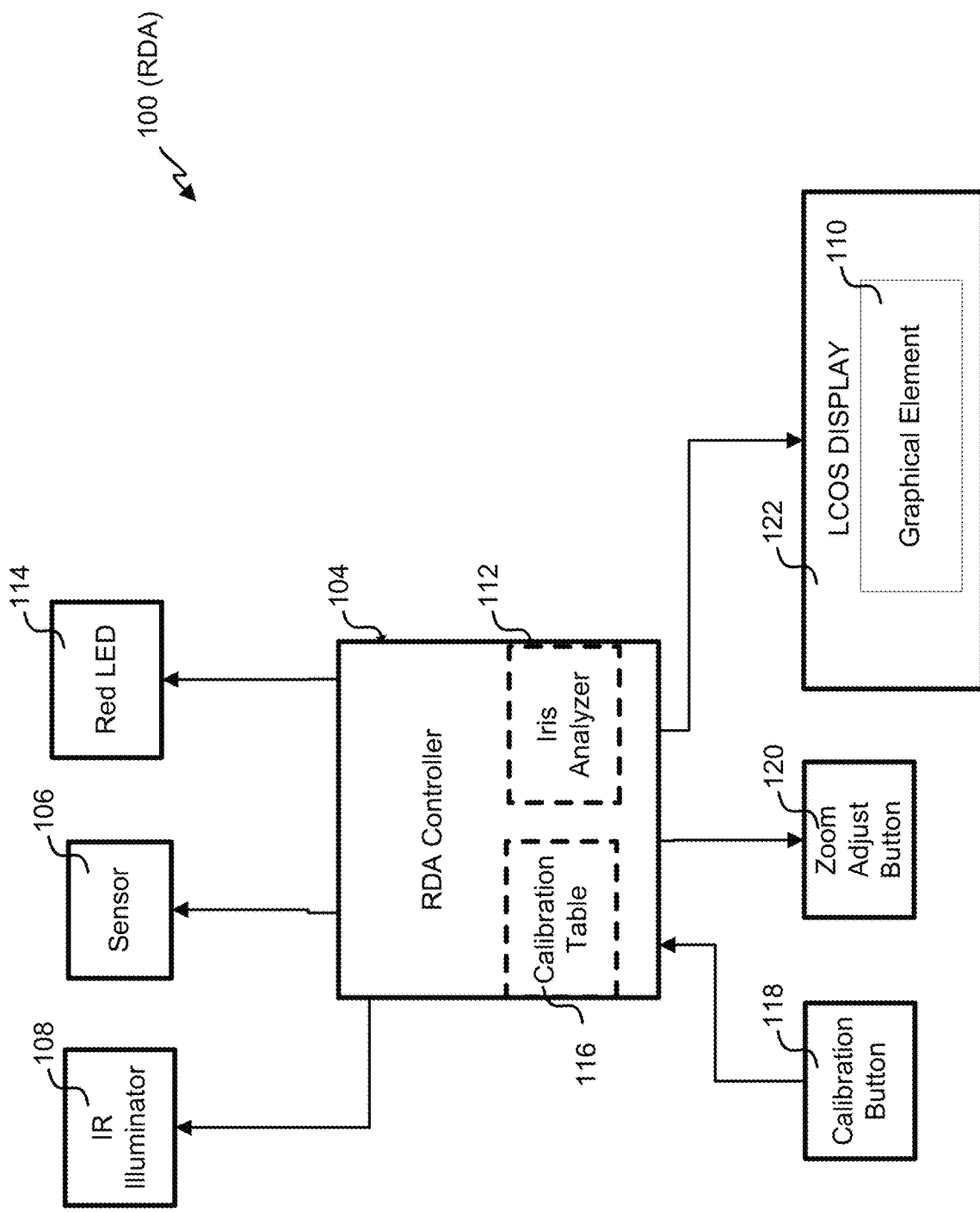
FIG. 1 is a block diagram of an automatic zoom sensing a RDA system, according to an embodiment.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

"Smart scopes" is a class of fire control riflescopes that provides an overlay of the ballistically corrected aiming coordinates based on target range, gun/bullet type, and atmospheric conditions. A "clip-on display" or riflescope display adapter (RDA) instantly converts a traditional riflescope into a "smart scope" with an illuminated electronic focal plane display projected into the riflescope with a 45° beam splitter in the objective space. The electronic aim point (e.g., cross-hair) is unaffected by any adjustments of the riflescope, including zoom or reticle movements made by twisting the elevation and windage turrets. However, the electronic display text and graphics would not conventionally track the changes as the user changes the scope zoom. Consequently, the character text may be too large and unreadable when zoomed in, or vice versa. This makes it unreadable unless the user intervenes and re-adjusts the display font size to track the changes in zoom. In a typical long range 5× to 25× zoom scope, the changes in text size must track approximately a 5× change in zoom. In the best case, it is an inconvenience for the shooter. In the worst case, it could be a detriment to timely engagement with a target and vital information is not present when needed. Examples include offset aim points, wind speed, range, cant, or elevation—all of which are used for engaging a long range shot.

In one embodiment, a solution is presented here automatically senses the zoom level in riflescope and automatically compensates the font size in the electronic display. In this method, a camera, 880 nm to 904 nm infrared illumination LED, and lenses are added in the same path to the display from the scope's 45° beam splitter. The IR LED projects onto the shooters eye via the scope, and the magnification of the iris (not pupil) is imaged through the zoom optic. The now clearly readable iris is focused onto the CMOS camera. Image processing finds the angular diameter of the iris and an algorithm estimates the zoom level from a look-up calibration table. The size of the iris is proportional to the zoom level of the scope. The IR LED provides illumination to the eye that does not interfere with the day or night-time use of the scope. The megapixel CMOS camera provides high sensitivity at the 880-904 nm wavelength with a suitable optical bandpass filter. This entire process would be embodied with some type of calibration button that is pressed by the user. The real-time zoom level is updated continuously to the display, or can be commanded with a button. The IR LED illumination is unconditionally eye safe.

This approach automatically adjusts the text font size proportional to the riflescope zoom level re-using key components already in the clip-on display, e.g. the 45° beam splitter. The zoom level is estimated based on the magnification of the shooter's iris diameter. A low-cost camera, and IR illumination LED, in combination with some image processing estimates the zoom level based on the diameter of the shooter's iris. Some minor optics makes this possible for high volume commercial or military applications.

The shooter no longer needs to manually re-adjust the text font size of the electronic display to the riflescope zoom level. This is a convenience feature, but it also reduces target engagement time, allowing rapid updates and timely shots to the target. The shooter no longer needs to re-adjust the text font size when the scope zoom level is changed. For example, a high magnification zoom scope, e.g. a 5-25× scope is unreadable unless the font size is changed to track the zoom level. It reduces target engagement time, allowing rapid updates and timely shots to the target.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

FIG. 1 is a block diagram of an automatic zoom sensing riflescope display adapter (RDA) system 100, according to an embodiment. As with other figures provided herein, FIG. 1 is provided as a non-limiting example. Embodiments may include some components that are not illustrated (e.g., a power supply). Moreover, alternate embodiments may combine, separate, rearrange, or otherwise alter the configuration of components illustrated in FIG. 1. Arrows between components illustrate electronic, data flow and/or optical connections between components.

An RDA controller 104 may comprise one or more processors generally configured to cause the various components of the RDA system 100 to automatically sense the zoom setting of an optical scope 206, calculate a ballistic solution (according to some embodiments), and operate a user interface. The RDA controller 104 may comprise without limitation one or more general-purpose processors (e.g. a central processing unit (CPU), microprocessor, and/or the like), one or more special-purpose processors (such as digital signal processing (DSP) chips, application specific integrated circuits (ASICs), and/or the like), and/or other processing structure or means.

One or more individual processors within the RDA controller 104 may comprise memory, and/or the RDA controller 104 may have a discrete memory (not illustrated). In any case, the memory may comprise, without limitation, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The RDA controller 104 can include an iris analyzer 112 and a calibration table 116. The RDA controller 104 can be communicatively coupled via electrical and/or optical connections to a sensor 106, an infrared (IR) illuminator 108, a red light emitting diode (LED) 114, a calibration button 118, a zoom adjust button 120, and a liquid crystal on silicon (LCOS) display 122. The LCOS display 122 can include at least one graphical element 110. In some examples, the sensor 106 can focus an image of an iris of an eye of a user. The iris can be illuminated by a beam from the IR illuminator 108. The iris analyzer 112 can determine a diameter of the iris from the image focused by the sensor 106. The RDA controller 104 can estimate a zoom level of an optical scope 206 via the calibration table 116. The RDA controller 104 can adjust a font of the at least one graphical element 110 based on the estimated zoom level for the optical scope 206.

Figure 2:
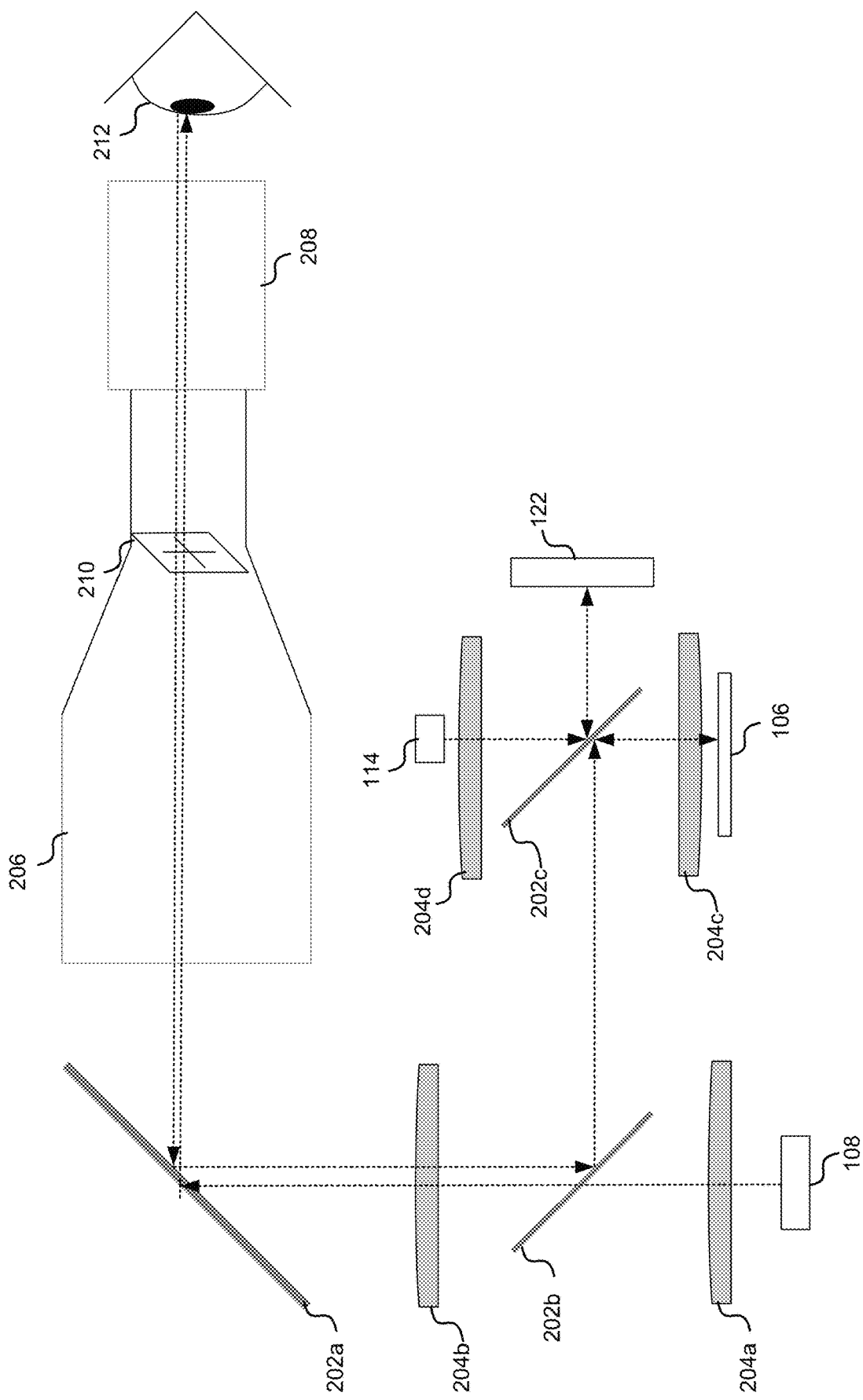
FIG. 2 is an illustration of optical components within an automatically aligning a RDA system, according to an embodiment.

FIG. 2 is an illustration of optical components within an automatically aligning RDA system 100, according to an embodiment. In this example, an infrared (IR) beam from an IR illuminator passes through a lens 204*a*, a beam splitter 202*b*, and a lens 204*b* before reaching a beam splitter 202*a*. The IR beam reflects off the beam splitter 202*a*, passes through a scope reticle 210 and an eyepiece 208 within an optical scope 206 before reaching an eye 212 of a user. The IR beam illuminates an iris of the eye 212. The IR beam retraces a path to the beam splitter 202*a*. The IR beam reflects off beam splitter 202*a*, passing through the lens 204*b* before reflecting off the beam splitter 202*b*. A portion of the IR beam reflects off a beam splitter 202*c*, passes through lens a 204*c* and reaches a sensor 106. The sensor 106 can focus an image of the iris.

In this example, a visible beam from a red LED 114 reflects off the beam splitter 202*c* and illuminates the LCOS display 122. A portion of the visible beam reflects off the LCOS display, passes through the beam splitter 202*c* and reflects off the beam splitter 202*b*. The portion of the visible beam then reflects off the beam splitter 202*b*, passes through the lens 204*b* and reflects off the beam splitter 202*a*. The visible beam continues along an optical path to the eye 212 of the user, passing through the scope reticle 210 and the eyepiece 208 of the optical scope 206. The visible beam can allow the user to see the LCOS display 122. The LCOS display 122 can include at least one graphical element.

An RDA controller 104 can determine a diameter of the iris from the image of the iris using an iris analyzer 112. The RDA controller 104 can estimate a zoom level of the optical scope 206 from the diameter of the iris via a calibration table 116. The RDA controller can adjust a font size of at least one graphical element on the LCOS display 122. The font size can be adjusted to match the zoom level of the optical scope 206.

Figure 3:
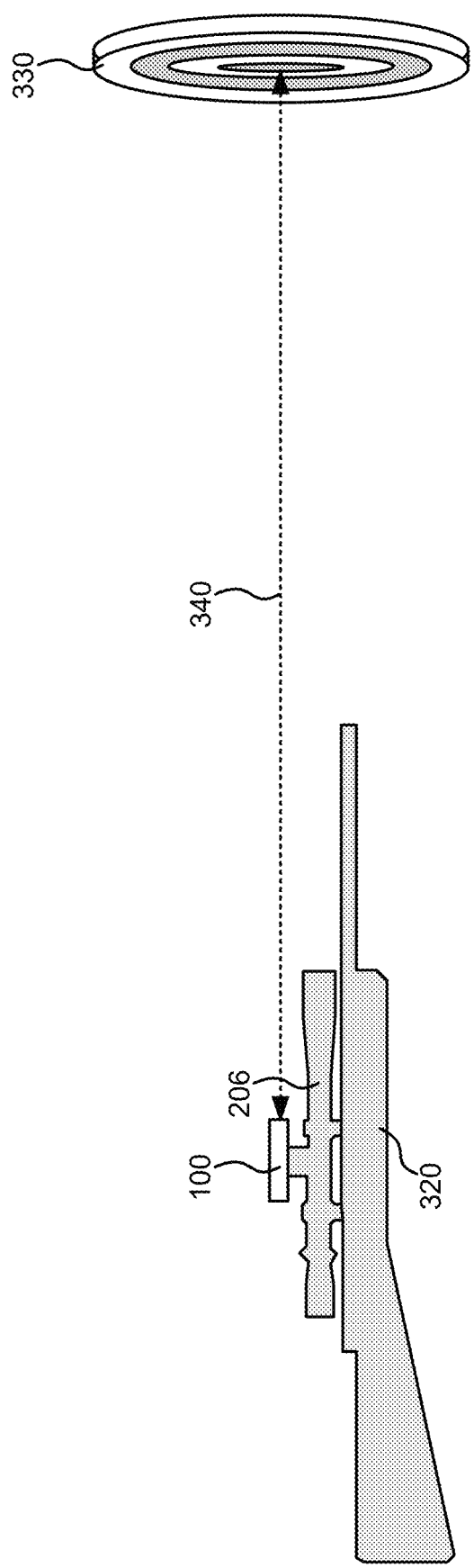
FIG. 3 is a simplified illustration of the basic operation of an automatic zoom-sensing RDA system, according to an embodiment.

FIG. 3 is a simplified illustration of the basic operation of an automatic zoom-sensing RDA system 100, according to an embodiment. The RDA system 100 and an optical scope 206 may be bore sighted to a weapon 320, allowing a user to use the optical scope 206 to aim the weapon 320 at a target 330 that is a distance 340 from the RDA system 100. The user may change the zoom settings of the optical scope 206 and the RDA can sense the change based at least in part on a diameter of an iris in an eye of the user. In some examples, the RDA system 100 removably attaches to the optical scope 206. The user can calibrate a zoom sensor by inputting information about zoom settings for the optical scope 206. For example, the user can input minimum and maximum zoom settings for the optical scope 206.

Figure 4:
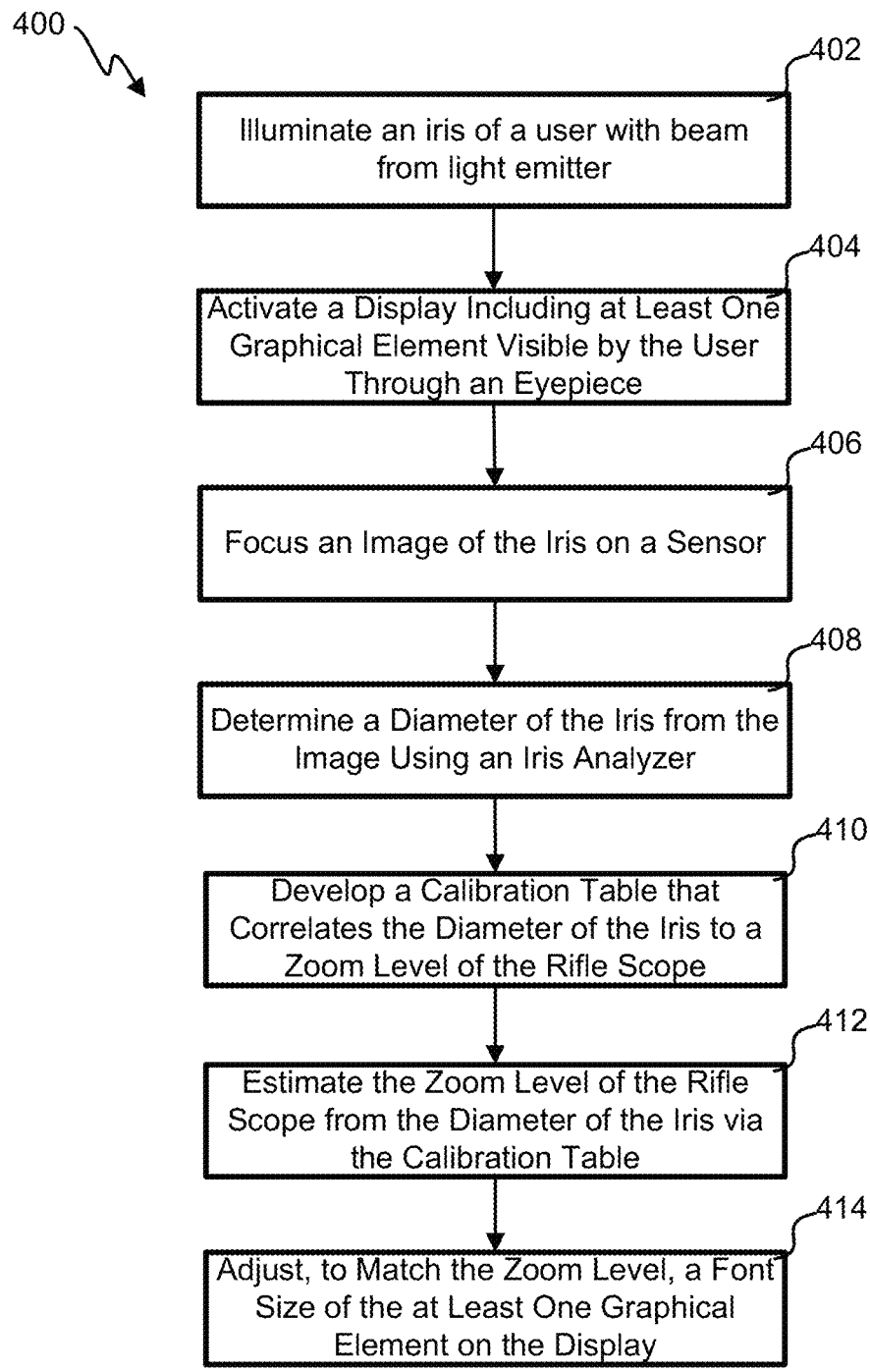
FIG. 4 is a process flow diagram of a method of automatically sensing a zoom level of an optical scope by a RDA system, according to an embodiment.

FIG. 4 is a process flow diagram of a method of automatically sensing a zoom level of an optical scope 206 by a RDA system 100, according to an embodiment. Here, the functionality of the blocks illustrated in FIG. 4 may be performed by one or more components of the RDA system 100, such as the components illustrated in FIGS. 1 and 3.

At block 402, the functionality includes illuminating an iris of a user with a beam from a light emitter. In some examples, the beam can be an infrared (IR) beam from an IR illuminator 106. The IR beam can provide illumination of the iris without interfering with daytime or nighttime use of the optical scope 206. The beam can be directed towards the iris through a 45 degree beam splitter 202a placed in front of the optical scope 206. By passing the beam through the beam splitter 202a, the user can make adjustments to the optical scope 206 without affecting an optical path of the beam.

The functionality at block 404 comprises activating a display, including at least one graphical element, visible by the user through an eyepiece 208. In some examples, activating the display can comprise illuminating the display using a visible light source. In some examples, the visible light source can be a red light emitting diode (LED) 114 and the display can be a liquid crystal on silicon (LCOS) display 122. A font of the at least one graphical element can be adjusted to match a zoom level of the optical scope 206. Examples of graphical elements include wind speed, wind direction, offset aimpoints, range, elevation, cant, etc.

At block 406, the functionality includes focusing an image of the iris on a sensor 106. In some examples, the sensor 106 is a camera or focal plane array. The sensor 106 can detect IR in some examples. In some examples, the sensor 106 is a complementary metal-oxide-semiconductor (CMOS) camera.

At block 408, the functionality includes determining a diameter of the iris from the image using an iris analyzer. The size of the iris is proportional to the zoom level of the optical scope 206. Since individuals have different irises, in some examples, the diameter of the iris can be used as a fingerprint of the user. In some examples, the determined diameter of the iris can be used to authenticate a user. In some examples, upon authenticating an authorized user, the RDA can be unlocked for use by the authorized user.

At block 410, the functionality includes developing a calibration table 116 that correlates the diameter of the iris to a zoom level of the optical scope 206. In some examples, developing the calibration table 116 includes receiving a first input from the user. The first input can specify a minimum zoom level for the optical scope 206. In some examples, the first input can be received directly from a user interface included in the RDA. In some examples, the first input can be received by the RDA due to communication with a user device, such as a smartphone. The diameter of the iris of the user can be determined at the minimum zoom level. In some examples, the diameter of the iris at the minimum zoom level can be determined when the user presses a minimum zoom calibration button.

Additionally, developing the calibration table 116 can include receiving a second input from the user. The second input can specify a maximum zoom level for the optical scope 206. In some examples, the second input can be received directly from a user interface included in the RDA. In some examples, the second input can be received by the RDA due to communication with a user device, such as a smartphone. The diameter of the iris of the user can be determined at a maximum zoom level. In some examples, the diameter of the iris at the maximum zoom level can be determined when the user presses a maximum zoom button. In some examples, developing the calibration table can include receiving a third input from the user. The third input can indicate the number of zoom levels associated with the optical scope 206.

At block 412, the functionality includes estimating the zoom level of the optical scope 206 from the diameter of the iris via the calibration table 116. As noted above, the size of the iris is proportional to the zoom level of the scope. When the zoom level is at the minimum zoom level, the diameter of the iris will be at a minimum value. In some examples, when the zoom level is at the minimum zoom level, the diameter of the iris can match, taking into account a resolution of the sensor 106, the diameter measured during calibration at the minimum zoom level. When the zoom level of the optical scope 206 is at the maximum zoom level, the diameter of the iris will be at a maximum value. In some examples, when the zoom level is at the maximum zoom level, the diameter of the iris can match, taking into account the resolution of the sensor 106, the diameter measured during calibration at the maximum zoom level. When the zoom level is at an intermediate zoom level, the zoom level can be estimated based on the diameter of the iris measured at the intermediate zoom level. In some examples, an algorithm can be used to estimate the zoom level. The estimate can be based, at least in part, on at least one of the diameter of the iris, the first input, the second input, and the third input of the user.

The functionality at block 414 comprises adjusting, to match the zoom level, a font size of the at least one graphical element 110 on the display. In some examples, when the zoom level of the optical scope 206 is changed to a new zoom setting, the at least one graphical element 110 is no longer visible due to a mismatch between the zoom level and the font size of the at least one graphical element 110. The font size can be adjusted so that the at least one graphical element 110 is visible at the new zoom setting. In some examples, the user can input preferred font settings at each zoom setting. The RDA can automatically adjust the font of the at least one graphical element 110 to the preferred font setting upon determining a zoom level change based on the diameter of the iris of the user. In some examples, the RDA can save preferred font settings for multiple users. The RDA can automatically load the preferred font settings of a particular user upon identifying the particular user based on measuring an iris diameter associated with the user for at least one zoom setting.

In some examples, a change in the diameter of the iris can be detected when the user pulls away from the optical scope 206. In such an example, a corresponding change in the font size of at least one graphical element may occur. In some examples, the iris analyzer 112 can identify the change as being associated with a pulling away event. When a pulling away event occurs, the change in the diameter of the iris can be a gradual, continuous change rather than an abrupt, discrete change such as the type of diameter change that can occurs when switching between zoom levels of the optical scope 206. The iris analyzer 112 can be programmed to recognize the pulling away event and correct the font size of the at least one graphical element 110 if needed.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Implementation of the techniques, blocks, steps and means described above may be done in various ways. For example, these techniques, blocks, steps and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of ±20% or ±10%, ±5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art. While the principles of the disclosure have been described above in connection with specific apparatuses and methods, it is to be clearly understood that this description is made only by way of example and not as limitation on the scope of the disclosure.

What is claimed is:

1. An automatic zoom-sensing method for a riflescope display adapter (RDA), the method comprising:
    illuminating an iris of a user with a beam from a light emitter;
    activating a display comprising at least one graphical element visible by the user through an eyepiece;
    focusing an image of the iris on a sensor;
    determining a diameter of the iris from the image of the iris using an iris analyzer;
    developing a calibration table that correlates the diameter of the iris to a zoom level of an optical scope;
    estimating the zoom level of the optical scope from the diameter of the iris via the calibration table; and
    adjusting, to match the zoom level, a font size of the at least one graphical element on the display.

2. The automatic zoom-sensing method of claim 1, wherein developing the calibration table comprises:
    receiving a first input from the user, the first input specifying a minimum zoom level for the optical scope;
    determining the diameter of the iris of the user at the minimum zoom level;
    receiving a second input from the user, the second input specifying a maximum zoom level for the optical scope; and
    determining the diameter of the iris of the user at the maximum zoom level.

3. The automatic zoom-sensing method of claim 1, wherein the RDA removably attaches to the optical scope.

4. The automatic zoom-sensing method of claim 1, wherein the sensor is a camera or a focal plane array.

5. The automatic zoom-sensing method of claim 1, further comprising:
    authenticating an authorized user based on the diameter of the iris;
    upon authenticating the authorized user, unlocking the RDA.

6. The automatic zoom-sensing method of claim 1, wherein activating the display comprises illuminating the display with a beam from a visible light emitting diode (LED).

7. The automatic zoom-sensing method of claim 1, wherein the light emitter is an infrared (IR) illuminator.

8. An automatic zoom-sensing riflescope display adapter (RDA) system comprising:
    a light emitter configured to illuminate an iris of a user with a beam;
    a display comprising at least one graphical element visible by the user through an eyepiece;
    a sensor configured to focus an image of the iris; and
    an RDA controller communicatively coupled to the light emitter, the display, and the sensor and configured to perform operations comprising:
        determining a diameter of the iris from the image of the iris using an iris analyzer,
        activating the display,
        developing a calibration table that correlates the diameter of the iris to a zoom level of an optical scope,
        estimating the zoom level of the optical scope from the diameter of the iris via the calibration table, and
        adjusting, to match the zoom level, a font size of the at least one graphical element on the display.

9. The RDA system of claim 8, wherein developing the calibration table comprises:
    receiving a first input from the user, the first input specifying a minimum zoom level for the optical scope;
    determining the diameter of the iris of the user at the minimum zoom level;
    receiving a second input from the user, the second input specifying a maximum zoom level for the optical scope; and
    determining the diameter of the iris of the user at the maximum zoom level.

10. The RDA system of claim 8, wherein the RDA removably attaches to an optical scope.

11. The RDA system of claim 8, wherein the sensor is a camera or a focal plane array.

12. The RDA system of claim 8, the operations further comprising:
    authenticating an authorized user based on the diameter of the iris; and
    upon authenticating the authorized user, unlocking the RDA.

13. The RDA system of claim 8, wherein activating the display comprises illuminating the display with a beam from a visible light emitting diode (LED).

14. The RDA system of claim 8, wherein the light emitter is an infrared (IR) illuminator.

15. A non-transitory computer-readable medium comprising instructions executable by a riflescope display adapter (RDA) controller of an automatic zoom-sensing RDA for causing the RDA controller to perform operations comprising:
    determining a diameter of the iris from the image of the iris using an iris analyzer;
    activating the display;
    developing a calibration table that correlates the diameter of the iris to a zoom level of an optical scope;
    estimating the zoom level of the optical scope from the diameter of the iris via the calibration table; and
    adjusting, to match the zoom level, a font size of the at least one graphical element on the display.

16. The non-transitory computer-readable medium of claim 15, wherein developing the calibration table comprises:
    receiving a first input from the user, the first input specifying a minimum zoom level for the optical scope;
    determining the diameter of the iris of the user at the minimum zoom level;
    receiving a second input from the user, the second input specifying a maximum zoom level for the optical scope; and
    determining the diameter of the iris of the user at the maximum zoom level.

17. The non-transitory computer-readable medium of claim 15, wherein the RDA removably attaches to an optical scope.

18. The non-transitory computer-readable medium of claim 15, wherein the tracking sensor is a camera or a focal plane array.

19. The non-transitory computer-readable medium of claim 15, the operations further comprising:
- authenticating an authorized user based on the diameter of the iris; and
- upon authenticating the authorized user, unlocking the RDA.

20. The non-transitory computer-readable medium of claim 15, wherein the display is a visible light emitting diode (LED) display.

\* \* \* \* \*